Patented July 31, 1934

1,968,151

UNITED STATES PATENT OFFICE 1,968,151

NEW HYDROXYLATED DERIVATIVES OF PARAFFINS

Karl Keller, Frankfort-on-the-Main-Fechenheim, and Eduard Gofferjé, Frankfort-on-the-Main, Germany, assignors to General Aniline Works, Inc., New York, N. Y., a corporation of Delaware No Drawing. Application February 17, 1931, Serial No. 516,504. In Germany July 30, 1929

3 Claims. (Cl. 260—156)

This application is a continuation in part of our application Serial No. 466,885, filed July 9, 1930.

Our invention relates to new hydroxylated derivatives of liquid or solid paraffins.

They are obtained by treating halogenation products of liquid and solid paraffins, containing more than 8 carbon atoms and at least 2 halogen atoms in the hydrocarbon molecule, with more or less concentrated mixtures of water and an alkali of the group consisting of caustic alkalies and alkaline earths and carbonates of alkali metals, advantageously with addition of a catalyst.

Whereas Schaarschmidt states in Berichte, volume 53, page 2133, that by the action of an alcoholic caustic potash solution at temperatures below 200° on chlorinated paraffins, olefines are obtained and when heating the same starting materials with aqueous solutions of alkalies only part of the chlorine can be eliminated, in contradistinction to that statement according to the present process the halogen can be eliminated entirely, and, moreover, the reaction runs different from the reactions of Schaarschmidt's publication, inasmuch as, besides the formation of double bonds, a greater or smaller portion of the halogen is replaced by oxygen-containing groups particularly by hydroxyl groups.

As starting materials the halogenation products of liquid and solid paraffins derived from petroleum or brown coal are suitable, which may be produced according to the methods known in literature. Depending on the halogen content of the starting materials, the elimination of the halogen occurs to a more or less degree.

When starting from relatively low halogenated products, it is necessary for the complete execution of the reaction to use temperatures above 210° and to work in a closed vessel. But when starting from highly halogenated products especially those containing at least 9 chlorine atoms in the average molecule, even without using high temperatures and pressure, for instance when boiling with concentrated caustic alkali solutions under reflux, products are obtained which contain substantially less chlorine than the starting materials. Particularly in this case the addition of a catalyst such as copper salts or oxides of other heavy metals favors the elimination of the halogen. In some cases it is of advantage to carry out the reaction under such conditions that the halogen atoms of the lower as well as of the higher halogenated paraffins are not entirely eliminated so that final products still containing halogen are obtained.

The products obtained according to the present invention are therefore more or less unsaturated, hydroxylated products partly containing halogen. They represent more or less viscous, slightly colored oils or light salvy products, partly in admixture with liquid ingredients. The products are valuable expedients in the textile and leather industry, for example they may be used as lubricating or greasing agents. So far as they still contain halogen, by replacing the halogen atoms by other groups further new products can be obtained.

The products obtained by a far-reaching elimination of halogen from highly halogenated paraffins correspond on account of their strong unsaturated character approximately to the type of the drying oils and may be used like those for the production of films of the character of the linseed oil varnishes. Their properties may be varied by different additions such as natural drying oils and filling materials, softening agents, etc.

In order to further illustrate our invention the following examples are given, the parts being by weight and all temperatures in centigrade degrees; but we wish it to be understood that we are not limited to the particular products nor reaction conditions mentioned therein:—

Example 1

48.5 parts of a chlorinated paraffin product, obtained by chlorinating hard paraffin of 56-58° melting point until it contains about 3.4 chlorine atoms calculated for an average molecular weight of 367 of the hard paraffin, are heated with 100 parts of a caustic soda solution of 16% strength for about 9 hours at 225–230° in an autoclave provided with a stirrer. When cool the oil thus obtained is separated from the alkaline solution, washed with warm water which is advantageously acidulated and dried. In this manner 42 parts of a light yellow oil are obtained containing about 1 chlorine atom in the molecule according to analysis. The iodine number of 59 corresponds to a little more than one double bond. The acetyl number is 56 (corrected). The product consists of two ingredients: an oil which is liquid at ordinary temperatures (about ¾ of the total weight) and a product which is tallowy at ordinary temperature (about ¼ of the total weight). The mixture as well as both components represent olefine alcohols which are capable of various use in textile and other industry.

Example 2

97 parts of the same starting material as used in Example 1 are heated with 125 parts of a caustic soda solution of 33° Bé. while stirring in an autoclave for 13-20 hours at 215-220°. The reaction mass is worked up as described in Example 1. When cool about 80 parts of a light product of buttery consistence are obtained. The new product still contains a small amount of chlorine. The iodine number is 76, the corrected acetyl number is 128, which latter corresponds to a little more than one hydroxyl group. From this product likewise about ⅓ of the total weight can be isolated as a tallowy product at ordinary temperatures.

When using instead of a caustic soda solution the corresponding quantity of a concentrated caustic potash solution a mixture of paraffin alcohols of similar character is obtained, the acetyl number of which is a little higher.

When heating the reaction mass at 230-235° a product is obtained which is entirely free from chlorine having a little higher iodine and acetyl number. It may be likewise separated into a liquid and a tallowy ingredient.

Example 3

44 parts of a chlorinated product, obtained by chlorinating a soft paraffin of 40-42° melting point until it contains about 4 chlorine atoms in the molecule, calculated for the average molecular weight of about 300, are heated with a solution of 45 parts of sodium carbonate in about 200 parts of water for about 16 hours at 230-235° in an autoclave while stirring. The reaction mass is worked up as described in Example 1. In this manner about 34 parts of a light brownish oil are obtained still containing about one chlorine atom in the molecule. The iodine number is 137, the corrected acetyl number 47.

When increasing the temperature of heating the components to 250° the same result is obtained.

When using instead of sodium carbonate the corresponding quantity of potassium carbonate an oil is obtained of similar properties.

When further treating the products thus obtained with more or less concentrated solutions of caustic soda or potash oils are obtained which are entirely free from chlorine having a little higher iodine number and a substantially higher acetyl number.

Example 4

54 parts of a chlorination product, obtained by chlorinating hard paraffin of 56-58° melting point until it contains about 5 chlorine atoms, are heated with a solution of 105 parts of barium hydroxide in about 450 parts of water for about 10 hours at 225-230° in an autoclave while stirring. When cool the oil is separated from the alkaline solution, washed with acidulated water and dried. About 42 parts of a viscous light oil are obtained which is liquid at ordinary temperatures. The product still contains chlorine, the amount being more than one, but less than two atomic proportions; its iodine number is about 125 and the acetyl number 86.

When using instead of barium hydroxide a corresponding quantity of milk of lime and continuing the heating for a longer time a product of similar properties is obtained.

Example 5

115 parts of a chlorinated paraffin, obtained by chlorinating hard paraffin until it contains 6 chlorine atoms in the molecule, are mixed with 225 parts of a caustic soda solution of 33° Bé. and a solution of 5 parts of copper sulfate in 12 parts of water. The mixture is heated for about 16 hours at 220-225° in an autoclave provided with a stirrer. When cool hydrochloric acid is added to the reaction mass until an acid reaction occurs and the oil is separated from the solution. About 88 parts of a light brownish oil are obtained still containing chlorine the amount being less than one atomic proportion. The iodine number is 139, the acetyl number 107.

When carrying out the reaction under the same conditions but without the addition of a copper sulfate a product is obtained containing 2 chlorine atoms in the molecule and having a smaller iodine number (120) and a substantially lower acetyl number (84).

Instead of copper salts hydroxides of other heavy metals, such as zinc hydroxide, iron hydroxide, may be used with the same result.

Example 6

87 parts of a transparent resinous chlorinated product obtained by chlorinating hard paraffin until it contains about 14 chlorine atoms in the molecule are boiled under reflux with 218 parts of a caustic soda solution of 33° Bé. for about 12 hours. The reddish brown reaction mass is separated from the excess soda solution and washed out with hot water. In this manner 71 parts of a reddish brown tough elastic and somewhat sticky mass is obtained which may be purified by redissolving it in organic solvents such as carbontetrachloride. The product still contains about 9 atoms chlorine. It is entirely saturated. The acetyl number is about 75.

If it is desired to obtain an oil of the character of the drying oils the same starting material is heated for about 10 hours at 150-160° in an autoclave with an excess quantity of milk of lime. The mass is worked up as described in Example 4. When spreading it as a thin film while giving access to air and warming it, an elastic film of high polish is obtained.

Example 7

49,5 parts of a chlorinated product, obtained by chlorinating American paraffin oil until it contains about 7 chlorine atoms, calculated for an average molecular weight of about 254, are heated with 100 parts of a caustic potash solution of 57% strength for some hours in an autoclave at 215-220° while stirring. When working up the reaction mass as described above about 36 parts of a brownish oil are obtained, which still contains 3 chlorine atoms in its molecule and is unsaturated. The acetyl number is about 85.

We claim:

1. Hydroxylated conversion products of technical mixtures of solid paraffin hydrocarbons characterized by an iodine number from zero to about 140 and an acetyl number from about 47 to about 130, which products contain chlorine in quantities corresponding at most to one chlorine atom represent viscous oils to semi-solid substances of yellowish to brownish color and are obtained by treating polyhalogenated derivatives of said hydrocarbon mixtures at temperatures from about 150° C. to 250° C. in an aqueous medium with an alkali of the group consisting of caustic alkalies, alkaline earths and carbonates of alkali metals.

2. A hydroxylated conversion product of hard paraffin of 56-58° C. melting point, characterized by the iodine number 76 and the acetyl number 128 and still containing a small quantity of halogen, which product represents a light composition of buttery consistence, and is obtained by heating a chlorinated hard paraffin containing less than 4 chlorine atoms in an autoclave for 18 to 20 hours at 210 to 220° C. with a caustic soda solution of 33° Bé.

3. A hydroxylated conversion product of soft paraffin of 40–42° C. melting point, characterized by the iodine number 137, the acetyl number 47 and a content of about 1 chlorine atom, calculated for the average molecular weight of about 300 of said soft paraffin, which product represents a light brownish oil, and is obtained by heating a tetrachlorinated soft paraffin for 16 hours in an autoclave at 230 to 235° C. with a sodium carbonate solution.

KARL KELLER.
EDUARD GOFFERJÉ.